United States Patent [19]

Lapoiriere et al.

[11] Patent Number: 4,927,883

[45] Date of Patent: May 22, 1990

[54] PROCESS FOR THE PREPARATION OF CROSSLINKED POLY β-ALANINE IN THE FORM OF MICROSPHERES

[75] Inventors: Claudine Lapoiriere, Le Perreux; Claude Mahieu, Paris; Christos Papantoniou, Montmorency, all of France

[73] Assignee: Societe Anonyme dite: L'Oreal, Paris, France

[21] Appl. No.: 283,960

[22] Filed: Dec. 13, 1988

[30] Foreign Application Priority Data

Dec. 16, 1987 [FR] France .................................. 87 17573

[51] Int. Cl.$^5$ .............................................. C08L 61/00
[52] U.S. Cl. ..................................... 525/154; 424/489; 424/501
[58] Field of Search ................. 525/154, 401; 424/501

[56] References Cited

U.S. PATENT DOCUMENTS 4,734,286  3/1988  Mahieu et al. .................. 525/154 X

FOREIGN PATENT DOCUMENTS 2705873  8/1977  Fed. Rep. of Germany .
2530250  1/1984  France .

OTHER PUBLICATIONS

French Search Report, Sep. 14, 1988.

*Primary Examiner*—Theodore E. Pertilla
*Attorney, Agent, or Firm*—Cushman, Darby & Cushman

[57] ABSTRACT

A process for preparing crosslinked poly β-alanine in the form of microspheres comprises (a) polymerizing acrylamide in a tert. butanol/toluene solvent mixture in the presence of a polymerization initiator and an octadecene-maleic anhydride copolymer as a suspension agent; (b) submitting the resulting suspension of poly β-alanine to a crosslinking reaction using a dialdehyde as the crosslinking agent; and (c) isolating the crosslinked poly β-alanine microspheres. These microspheres exhibit a low size dispersity.

4 Claims, No Drawings

PROCESS FOR THE PREPARATION OF CROSSLINKED POLY β-ALANINE IN THE FORM OF MICROSPHERES

The present invention relates to the preparation of crosslinked poly β-alanine in the form of spheres exhibiting a low size dispersity.

Crosslinked poly β-alanine as well as a process for its preparation has been described in French Pat. No. 83.11609 (2.530.250).

According to this process, there is initially prepared, by polymerization, starting with acrylamide, water-soluble poly β-alanine. In a second stage an aqueous solution of poly β-alanine, in suspension in an organic solvent, is crosslinked using a crosslinking agent.

The resulting spheres of crosslinked poly β-alanine are then submitted to a screening operation so as to obtain spheres possessing a certain size homogeneity.

The organic solvent can be cyclohexane, toluene, methyl benzoate, benzyl benzoate, chlorobenzene or even dichloroethane.

In accordance with this known process, the spheres are formed during the crosslinking step and their size depends essentially on the nature and amount of the suspension agent employed.

It is, however, not possible to obtain by this known process spheres having a low size dispersity, so that the spheres once obtained must necessarily be submitted to a screening operation which seriously complicates the process and increases in a non-negligible manner the cost of recovering the crosslinked poly β-alanine spheres.

For certain uses it is, in effect, significant that the spheres exhibit a low size dispersity and principally in their use as supports for column chromatography or as a vehicle for active substances.

The process according to the present invention permits to obtain, with a good yield, crosslinked poly β-alanine in the form of microspheres, these microspheres having a very low size dispersity which accordingly permits to avoid a long and laborious screening operation.

The process according to the present invention is essentially characterized by the fact that it comprises the steps of (a) polymerizing acrylamide in a tert.butanol/toluene solvent mixture, in the presence of a polymerization initiator and an octadecene-maleic anhydride copolymer as a suspension agent;
(b) submitting the suspension of resulting poly β-alanine microspheres to a crosslinking operation using a dialdehyde as the crosslinking agent; and
(c) isolating the resulting crosslinked poly β-alanine microspheres.

In accordance with the process of the present invention, the low size dispersity of the crosslinked poly β-alanine microspheres is due essentially to the nature and amount of the solvent mixture employed during the polymerization of acrylamide.

As noted above, it is a question of a mixture of tert. butanol and toluene, in ratios ranging between 1:24 and 10:1 and preferably between 1:6 and 6:1.

In that which also concerns the size of the microspheres, the size depends not only essentially on the ratio between the tert. butanol and toluene but also on the ratio of the solvent mixture to acrylamide and the rate of stirring or agitation.

In a general fashion the more the amount of tert. butanol is increased with respect to toluene, the more the diameter of the microspheres is decreased.

The polymerization initiator is preferably sodium or potassium tert. butylate employed in an amount of about 0.1 to about 2 moles/% with respect to the acrylamide.

The polymerization temperature is in the order of 60° C. to about 100° C., but preferably about 80° C.

The dialdehyde is preferably glutaraldehyde, (in the form of a 20–25% aqueous solution) employed in an amount ranging between 1–15 weight percent relative to the weight of the initial acrylamide.

The microspheres obtained in accordance with the present invention, when they are intended for therapeutic use, can be submitted to a reducing reaction, for example with sodium borohydride or any other similar reducing agent, so as to reduce any free aldehyde functions which may exist.

There is now given, as an illustration and without any limiting character, several examples of preparing crosslinked poly β-alanine in the form of microspheres in accordance with the process of the present invention.

EXAMPLE 1

A. Into a 3-liter reactor, fitted with a stirrer of the "anchor" type, having a diameter of 90mm, a nitrogen lead in tube, an adding funnel and a distillation column head, there are introduced: 1,125g of toluene, 44g of tert. butanol and 0.75g of octadecene-maleic anhydride copolymer (sold under the trade name "PA-18" by Gulf). After heating this mixture to 70° C., 150g of acrylamide are added. The temperature of the reaction mixture is then increased to 100° C. and 90ml of the water/toluene tert. butanol azeotropic mixture are distilled. At the end of the distillation, the reaction mixture is cooled to 80° C., and the rate of stirring is adjusted to 600rpm. There is then added over a 10 minute period, a solution of 3.36g of potassium tert. butylate in 62g of tert. butanol. The adding funnel is rinsed with 75g of toluene. After stirring for 5 hours at 80° C., the temperature of reaction mixture is permitted to return to ambient temperature. There are then slowly added to the mixture 11.25ml of concentrated HCl.

B. To the suspension of poly β-alanine microspheres thus obtained there are added, over a 30 minute period and with vigorous stirring (600rpm) and at a temperature of 50° C., 42g of a 25% aqueous solution of glutarladehyde. After having continued to stir the reaction mixture for 4 hours at this temperature the suspension is permitted to return to ambient temperature.

After decanting, the supernatant solvents are removed and the microspheres are washed twice with 500ml ethanol. Draining after each washing is carried out by centrifugation (3,500rpm). A washing with 15 liters of water is then carried out continuously, and then the water is removed until a final mixture volume of 600ml is reached.

The crosslinked poly β-alanine is then dried by lyophilization and 135g of a white powder are obtained, the diameter of the microspheres being, on average, from $4.60 \pm 1.19 \mu m$, determined by the image analysis technique using a "QUANTIMET 900" apparatus sold by Cambridge Instruments Co.

The resulting microspheres absorb 1.5 times their weight in water.

EXAMPLE 2

To the suspension of microspheres obtained in Example l(A) there are added, over a 30 minute period with vigorous stirring (600rpm) and at a temperature of 50° C., 7.5g of a 20% aqueous solution of glutaraldehyde. After having maintained stirring for 4 hours at this temperature, the suspension is permitted to return to ambient temperature. After decanting, the supernatant solvents are removed, and the microspheres are washed twice with 500ml of ethanol. Draining after each washing is carried out by centrifugation (3,500rpm). A washing with 15 liters of water is then carried out continuously. The water is then removed until a final volume mixture of 600ml is reached.

The crosslinked poly β-alanine is then dried by lyophilization and 135g of white powder are obtained. The diameter of the microspheres is, on average, 4.22±2.49 μm, measured in accordance with the same method as in Example 1.

EXAMPLE 3

This example is identical to Example 1 except that in step (A) 222g of tert. butanol rather than 444g are employed.

The resulting crosslinked poly μ-alanine microspheres have a diameter ranging between 28.7βm and 45.6βm for about 85 weight percent of the powder. The measurement was carried out using a "Coulter Counter Model TA II" apparatus fitted with "Population Accessory" by means of a tube having a 280μm orifice, sold by Coulter Electronics Ltd.

EXAMPLE 4

This example is identical to Example 1 except that in step (A) 1,110g of tert. butanol rather than 444g are employed.

The resulting crosslinked poly β-alanine microspheres have a diameter on the average of 0.81±0.55μm, measured in accordance with the same method as in Example 1.

EXAMPLE 5

In accordance with the same operating procedures as described in Example 1 crosslinked poly β-alanine spheres are prepared starting with:

| | |
|---|---|
| acrylamide | 50 g |
| toluene | 467 g |
| tert. butanol | 833 g |
| octadecene-maleic anhydride copolymer, sold under the trade name "PA-18" | 0.7 g |
| potassium tert. butylate (in 20 g of tert. butanol) | 1.12 g |
| concentrated HCl | 7 ml |
| glutaraldehyde (25% solution) | 30 g |

In accordance with this Example, the polymerization time has been carried out for 15 hours at a stirring rate of 800rpm.

After washing and drying by lyophilization 40g of a white powder are obtained. The diameter of the microspheres, on average, is 0.63±0.27μm, measured in accordance with the same method as in Example 1.

EXAMPLE 6

This example is identical to Example 5 except that the polymerization time is adjusted to 5 hours with a stirring rate of 400rpm.

After washing and drying by lyophilization 20g of microspheres are obtained. The diameter of the microspheres is, on average, 0.25±0.12 μm, measured in accordance with the same method as in Example 1.

EXAMPLE 7

To a suspension of poly β-alanine microspheres obtained in Example 1 (A), there are added 150ml of water, with vigorous stirring (600rpm) at a temperature of 50° C. Then, regularly over a 15 minute period, 18g of a 25% aqueous solution of glutaraldehyde are added. After having maintained stirring for 4 hours at this temperature, the suspension is permitted to return to ambient temperature. After decanting, the supernatant solvents are removed and the microspheres are washed twice with 500ml of ethanol. Draining after each washing is carried out by centrifugation (3,500rpm). A washing with 15 liters of water is then carried out continuously. The water is removed until a final mixture volume of 600ml is reached. The swollen polymer is finally dried by lyophilization and there are obtained 132g of white powder constituted of microspheres. The average diameter of the microspheres is 4.05±2.02μm which is determined by the image analysis technique using a "QUANTIMET 900" apparatus of Cambridge Instruments Co.

EXAMPLE 8

Reduction of residual aldehyde functions

To 150g of crosslinked poly β-alanine microspheres obtained in the same manner as in Example 7, 2.2 liters of water are added, and the mixture is homogenized by stirring. After cooling to a temperature between 5 and 10° C. there is slowly added a cooled solution of sodium borohydride in water (5.2g of NaBH$_4$ in 600ml of water cooled to 5° C). The temperature of the reaction mixture is maintained between 5 and 10° C. for 5 hours. The pH is then adjusted to 7 by the addition of acetic acid.

After centrifuging the mixture and dispersing the solid residue in 450ml of water, the resulting dispersion is continuously washed with 5 liters of water (washing in an "Amicon" type cell equipped with a 0.2μm Diapor filter, 2 bars pressure, stirring throughout the whole of the washing). The hydrated microspheres are then dried by lyophilization. The absence of color in the presence of a Schiff reagent permits to conclude that the residual aldehyde functions have been reduced. After analysis, the diameter of the microspheres is identical to the starting microspheres (≃4μm).

COMPARATIVE EXAMPLE

Preparation of spheres in accordance with French Pat. No. 83.11609 (2.530.250).

In a solution of 18g of ethyl hydroxyethyl cellulose, sold by Hercules under the trade name "EXTRA HIGH", in 900g of cyclohexane heated to 50° C., there are introduced 150g of poly β-alanine in solution in 75g of water adjusted to pH=1 with concentrated HCl, diluted by 75g of a 25% solution of glutaraldehyde in water. The suspension is heated to 50-55° C., with stirring at 1,300rpm for 3 hours. After letting the suspension return to ambient temperature the microspheres are washed as indicated in Example 1 above.

After drying 100g of crosslinked poly β-alanine are obtained having the following size distribution:

| Diameter (μm) | Weight % |
| --- | --- |
| 9.00 | 0.4 |
| 11.4 | 1.1 |
| 14.3 | 1.9 |
| 18.1 | 2.8 |
| 22.8 | 6.2 |
| 28.7 | 9.5 |
| 36.2 | 14.5 |
| 45.6 | 20.3 |
| 57.4 | 21.6 |
| 72.4 | 16.8 |
| 91.2 | 3.2 |
| 114.9 | 1.6 |

The measurement has been carried out using a "Coulter Counter Model TA II" apparatus fitted with "Population Accessory" by means of a tuber having a 280 μm orifice and sold by Coulter Electronics Ltd.

The size distribution of the poly β-alanine spheres of Example 3, determined in accordance with the same method, provides the following results:

| Diameter (μm) | Weight % |
| --- | --- |
| 9.0 | 0.9 |
| 11.4 | 1.0 |
| 14.3 | 0.9 |
| 22.8 | 1.8 |
| 28.7 | 16.9 |
| 36.2 | 44.0 |
| 45.6 | 23.9 |
| 57.4 | 6.7 |
| 72.4 | 2.5 |
| 91.2 | 0 |
| 114.9 | 0 |

As can be observed, there is obtained, by the process in accordance with the present invention, a lower size disparity of spheres, of which 85 weight percent are between 28.7 and 45.6μm as compared to only 44 weight percent, following the process of French Pat. No. 83.11609 (2.530.250).

What is claimed is:

1. A process for preparing crosslinked poly β- alanine in the form of microspheres having a low size dispersity comprising
   (a) polymerizing acrylamide in a tert. butanol/toluene solvent mixture, wherein the ratio of tert. butanol to toluene ranges from 1.24 to 10:1, in the presence of a polymerization initiator and an octadecene-maleic anhydride copolymer as a suspension agent;
   (b) submitting the resulting suspension of poly β-alanine microspheres to a crosslinking reaction using a dialdehyde as the crosslinking agent; and
   (c) isolating the resulting crosslinked poly β- alanine microspheres.

2. The process f claim 1 where in said tert. butanol/-toluene solvent mixture, the ratio of tert. butanol to toluene ranges from 1.6 to 6:1.

3. The process of claim 1 wherein said polymerization initiator is sodium tert. butylate present in an amount of 0.1 to 2 moles/percent in regard to said acrylamide.

4. The process of claim 1 wherein said dialdehyde is glutaraldehyde, in a 20–25 percent aqueous solution, and employed in an amount ranging from 1 to 15 weight percent relative to the initial acrylamide.

* * * * *